US012006617B2

(12) United States Patent
Bell

(10) Patent No.: US 12,006,617 B2
(45) Date of Patent: Jun. 11, 2024

(54) ACCESSIBLE AND PORTABLE SOLAR-POWERED WASHER DRYER

(71) Applicant: Tawaun Bell, Warner Robins, GA (US)

(72) Inventor: Tawaun Bell, Warner Robins, GA (US)

( * ) Notice: Subject to any disclaimer, the term of this patent is extended or adjusted under 35 U.S.C. 154(b) by 296 days.

(21) Appl. No.: 17/527,708

(22) Filed: Nov. 16, 2021

(65) Prior Publication Data
US 2023/0151525 A1 May 18, 2023

(51) Int. Cl.
*D06F 23/04* (2006.01)
*D06F 25/00* (2006.01)
*D06F 34/08* (2020.01)
*D06F 34/10* (2020.01)
*H01M 10/0525* (2010.01)
*H01M 10/46* (2006.01)
*H02J 7/00* (2006.01)
*H02S 40/38* (2014.01)

(52) U.S. Cl.
CPC .............. *D06F 34/10* (2020.02); *D06F 23/04* (2013.01); *D06F 25/00* (2013.01); *D06F 34/08* (2020.02); *H01M 10/0525* (2013.01); *H01M 10/465* (2013.01); *H02J 7/0063* (2013.01); *H02S 40/38* (2014.12); *H01M 2220/30* (2013.01); *H02J 2300/24* (2020.01); *Y02B 40/18* (2013.01)

(58) Field of Classification Search
None
See application file for complete search history.

(56) References Cited

U.S. PATENT DOCUMENTS

2011/0099834 A1* 5/2011 Brown .................... D06F 58/20
34/132
2011/0197464 A1* 8/2011 Chappell ................ F26B 9/003
34/232

* cited by examiner

*Primary Examiner* — Levon J Shahinian
(74) *Attorney, Agent, or Firm* — Smith Gambrell & Russell LLP

(57) ABSTRACT

This invention is a combination washer and dryer powered by solar energy. The solar energy unit collects solar energy and converts it into electrical energy which is stored in an energy storage device. The solar energy unit connects to the main enclosure to power the electronic control circuits and the motor in the main enclosure. Within the main enclosure is a second energy storage device. The main enclosure also comprises a receptacle for liquid, detergent, and the clothing bin. The clothing bin is rotated or agitated by a motor according to instructions provided by the electronic control circuit and powered by either the solar panel directly or by one of the two energy storage devices.

8 Claims, 13 Drawing Sheets

ACCESSIBLE AND PORTABLE SOLAR-POWERED WASHER DRYER

BACKGROUND

It is difficult for a handicapped person, especially those in a wheelchair, to access a normal sized top-loading washing machine. Likewise, it is difficult for a wheelchair-bound person to unload a standard top-loading washing machine and to transfer the wet laundry to a dryer. Therefore, improvements are needed specially to make this task easier for someone in a wheelchair or otherwise impaired in movement/motion.

Further, conventional washing and drying machines are large, heavy, and stationary, making it hard to transport or move, especially for those with handicaps. In addition, washing and drying clothing with conventional machines pollutes the atmosphere.

Therefore, there is a need for a washer and dryer that solves the above identified problems.

SUMMARY

This invention relates to a solar-powered combined washer-dryer apparatus. In an aspect, the combination washer-dryer is configured to be portable and easily accessible and movable by handicapped individuals. This apparatus includes a rigid enclosure, a cylindrical liquid-tight receptacle within the enclosure, a clothes bin, a motor, an electronic control circuit and a detachable power unit. The clothes bin sits within the receptacle. Liquid and detergent may be added to the receptacle along with clothing. The detachable power unit may comprise a solar panel and an energy storage device. The main enclosure may also contain a second energy storage device. The detachable power unit is connected to the electronic control circuit through a port. The detachable power unit provides power for the electronic control circuit and the motor to rotate the clothes bin.

The accompanying drawings are included to provide a further understanding of the invention and are incorporated in and constitute part of this specification, as well as illustrate several embodiments of the invention that together with the description serve to explain the principles of the invention.

DETAILED DESCRIPTION

Figure 1:
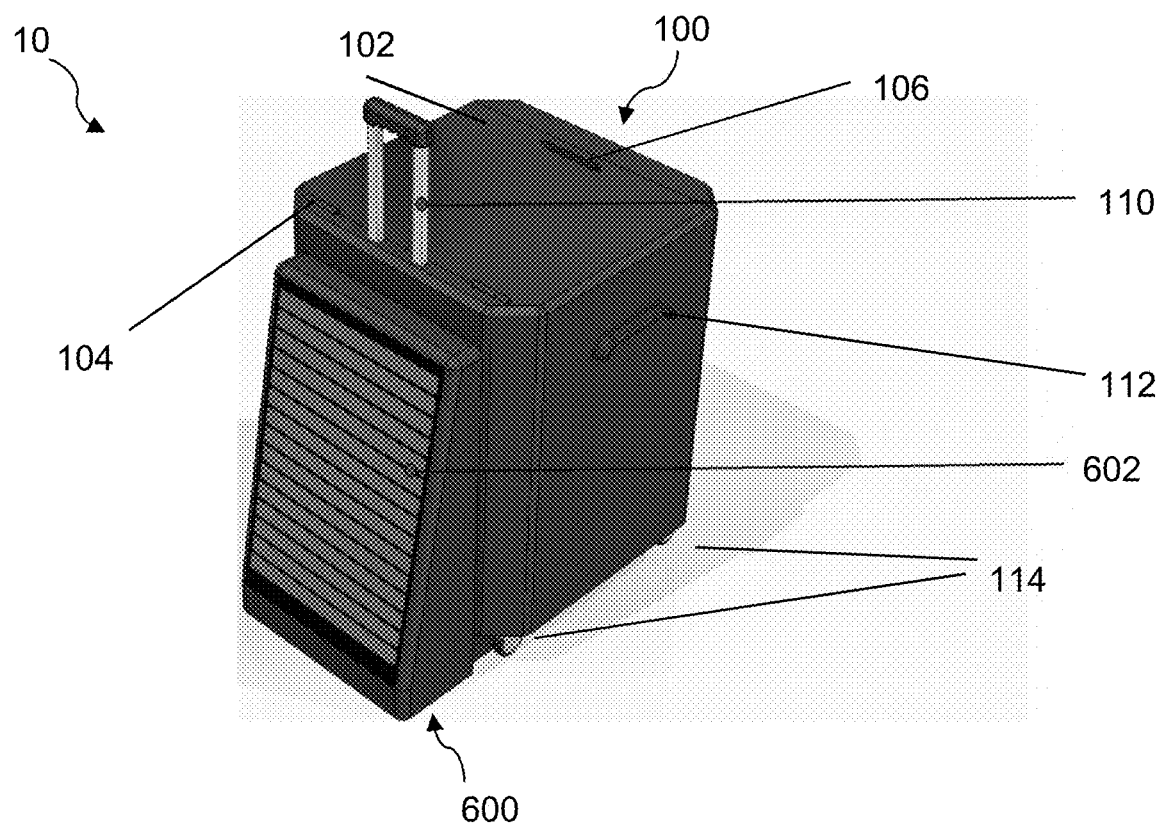
FIG. 1 shows a top perspective view of the portable solar-powered washer/dryer according to an aspect of the present invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures, and techniques have been shown in detail in order not to obscure an understanding of this description. The present disclosure relates to a portable solar-powered combination washer-dryer for clothing.

People who are handicapped or confined to a wheelchair are not able to easily use top-loading washing machines or dryers. It is difficult to load and unload such machines as well as to load and unload dryers. This combination washer/dryer allows a person confined to a wheelchair to load and empty the machine of the load of laundry while removing the need to transfer the load of wet laundry from one machine to another. The invention also uses a smaller size tumbler, allowing the unit 10 to sit closer to the ground and makes the size of the load more manageable. In addition, the combination washer/dryer can utilize a renewable energy source (e.g., solar power) rather than relying on sources of conventional electricity generation such as coal. In an aspect, the electricity thereby generated by solar power is either used to power the washer/dryer directly or is stored for later use in an energy storage element such as a battery.

The combination washer/dryer unit 10 is described in FIGS. 1-12 according to an aspect of the present invention. As shown, the unit 10 may include an enclosure/housing 100, a removable clothes container 200, a receptacle 300 contained within the enclosure 100 and configured to receive the clothes container 200, a mechanical subsystem 400 configured to perform the washing and drying functions, a liquid disposal subsystem 500, a power supplying subsystem 600, and a control electronics sub-system 700. In an aspect, the detachable power supply 600 resides outside the enclosure 100. These components work together to wash and dry clothes in a single unit 10 in a more energy efficient and convenient fashion, especially for those individuals with disabilities. These systems will be described in greater detail below.

The enclosure 100 comprises an upper portion 100a and a lower portion 100b. The upper portion 100a comprises a door 102 attached by a hinge 104 to the lower portion 100b. The hinge 104 may include a bias (not shown) (e.g. a spring or a counter-weight) so that the door 102 may remain open without requiring the user to continually hold it up while loading or unloading laundry. The bias therefore frees up the user's hands to load or unload laundry rather than holding open the door. In an embodiment a display 704, discussed in more detail below, may be mounted on top of the door 102.

Inside the enclosure 100 sits a liquid-tight receptacle 300. Inside the enclosure 100, but outside of the receptacle 300, may reside the control electronics 700, a second energy storage element 612, a mechanical sub-system 400, and a liquid disposal sub-system 500.

In an embodiment, the enclosure 100 may have one or more handles 106, 110, 112 affixed, for instance, to the sides or the top of the enclosure 100. In an embodiment, a top handle 110 may be retractable to within the enclosure 100 and may be extended for ease of re-positioning the enclosure 100 when so desired. In an embodiment a side handle 112 may be used to move the unit 10 around. In an embodiment the door 102 may include a door handle 106 to raise or lower the door 102. The enclosure 100 may sit on rollers, wheels, or casters 114 which allow the unit 10 to be rolled easily along a flat surface. In an aspect, the system 10 utilizes four casters 114. However, other various combination of casters 114 that allow the enclosure 100 to be easily transported can be utilized. Further, other types of devices similar to casters (ball bearings, anchored wheels, etc.) may be utilized to move the system 10 without the need to lift the system 10 from off the ground.

The enclosure 100 may also have a recess 116 on the bottom portion 100b to allow easy mating with the detachable power unit 600 without compromising the ease of re-positioning the enclosure 100. The enclosure 100 may also have an electrical connection 606 to enable communication between the enclosure 100 and the detachable power unit 600 or to transfer energy between the enclosure 100 and the detachable power unit 600.

The receptacle 300 is a liquid-tight container which may hold a clothes bin 200. The receptacle 300 also may contain a drain plug 302 (or a drain cap), which in normal operation is in the closed position allowing the receptacle 300 to contain liquid. When draining liquid out of the receptacle 300, the drain plug 302 will be opened by operation of a rack and pinion gear sub-system 450 driven by the mechanical sub-system 400, detailed below. In an embodiment, the receptacle 300 may also comprise an axle 304, upon which the clothes bin 200 rests. The axle 304 may be rotated or agitated by the mechanical sub-system 400 at the direction of the control electronics sub-system 700. The receptacle 300 may also comprise a lint trap 306 with a lint screen 308 for filtering out lint from the air flowing over the drying clothes. The clothes bin 200 is removable and rotatable. In an aspect, in normal operation, the clothes bin 200 may be connected to a motor 402 for spinning the bin 200.

The receptacle 300 may be manufactured from hard plastic or any other liquid-proof material able to withstand heating. For instance, in an embodiment acrylonitrile butadiene styrene (ABS) plastic, or some other thermoplastic may be employed to form the main enclosure 100 or the receptacle 300 or both.

Figure 5A:
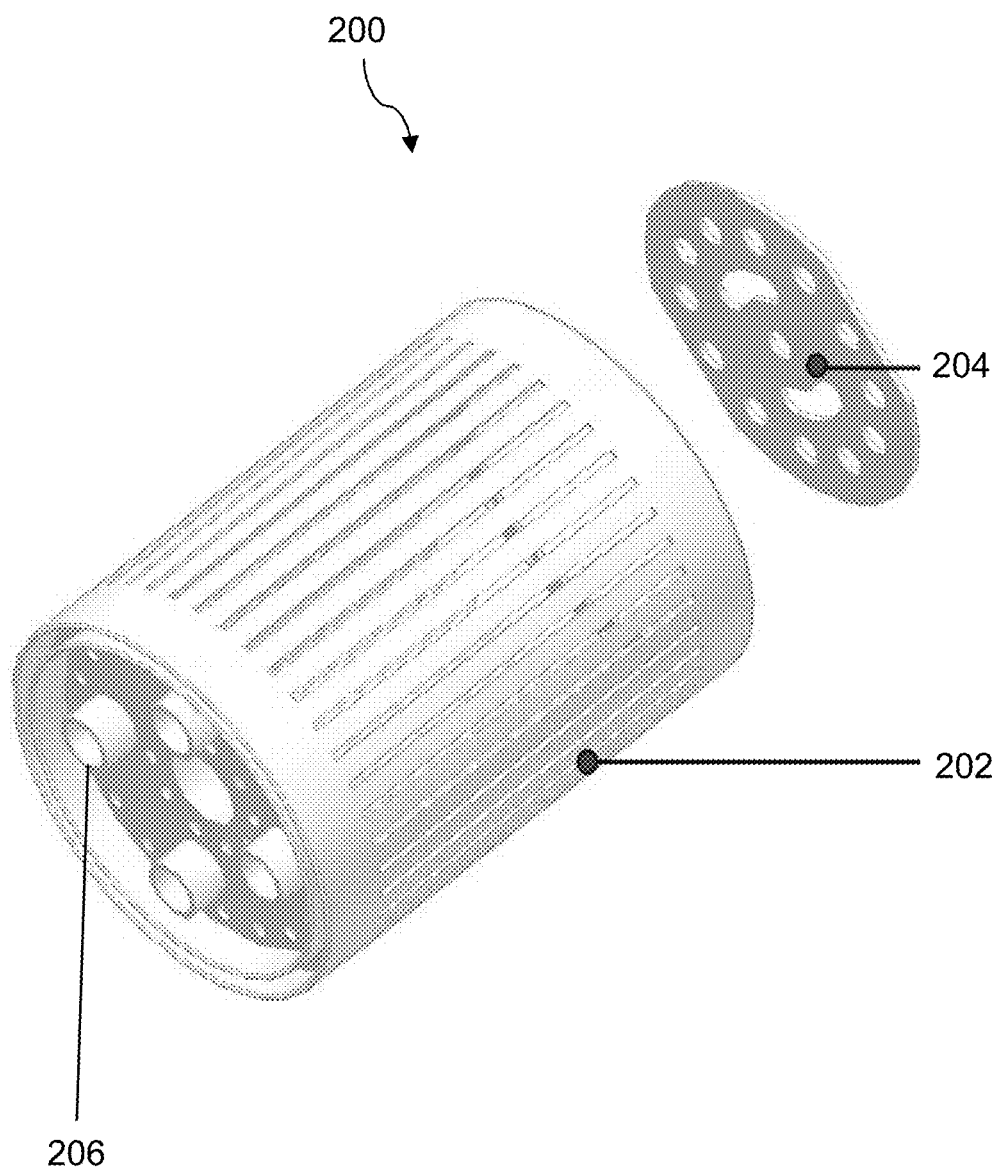
FIG. 5a shows a clothing bin with top.

The combination washer-dryer unit 10 is meant to make it easier to wash and dry laundry without having to go to the inconvenience of transferring a load of laundry from a washing machine to a dryer. In an aspect, a specially designed clothes bin 200 is used to contain the clothes during the washing and drying cycles. The clothes bin 200 may be constructed of plastic, metal, or other materials which are impermeable to liquid and heat resistant. This clothes bin 200 is designed to withstand heating during the drying cycle so that a separate unit is not required. In addition, the clothes bin 200 may have openings 202 to enable a spin dry cycle at the end of the wash cycle (step 806). In an embodiment, the clothes bin may have a mating portion 206 designed to be mounted onto an axle 306 inside the receptacle 300. In an embodiment, the clothes bin 200 is removable and may have a removable top 204 as shown in FIG. 5a. In another embodiment, the door 102 of the enclosure 10 may act as the top of the clothes bin 200. In an aspect, the door 102 may be sized to match substantially the entire top of the receptacle 300 to prevent liquid from leaving the enclosure 100. The door 102 may include a latch or lock to insure it remains in the closed position to contain the liquid within the receptacle 300 during a wash cycle.

Inside the enclosure 100, but separate from the receptacle 300, is a mechanical sub-system 400. This mechanical sub-system 400 comprises a motor 402 and a connector 404 (e.g. a belt) between the motor 402 and those components which require moving. The motor 402 is powered by one of the energy storage elements 610, 612 or directly by the detachable power unit 600. The motor 402 may rotate or agitate the clothes bin 200, for instance, by a belt 404 connecting the rotatable motor shaft with an axle 304 with a liquid-tight feed through into the receptacle 300. The motor 402 may also, at the appropriate time in a wash/dry cycle, raise the drain cap 302 to unplug the drain 301. This method of opening the drain 301 of the main receptacle 300 is described in more detail below.

Inside the enclosure 100 in the lower portion 100b is a liquid drainage tank 502, located below the receptacle 300. The liquid drainage tank 502 has an inlet or entry hole 508 located just below the receptacle drain 301. When the wash cycle is completed, the control electronics 700 cause the motor 402 to move the receptacle drain plug 302 so that the receptacle drain 301 is opened up and the liquid and detergent (or other liquid) drain by gravity into the liquid drainage tank 502. To complete the process, the liquid drainage tank 502 may be removed from the enclosure 100 and positioned over a sink or drain or some kind of liquid outlet. The drainage tank's exit hole 512 has its own plug 514. The user may release the liquid by pulling up on the knob 518 attached to a shaft 516 connected to the exit hole drain plug 514.

An electronic control circuit 700 may reside also within the enclosure 100 of the unit 10. This circuit 700 may comprise a printed circuit board with computer chips or other circuit elements residing on the board. The control circuit 700 may communicate with the user via an interface including a display 704. In an embodiment, the user communication and display may comprise a touch screen display 704. The display 704 may reside on the same circuit board or may be separate from the circuit board. In an embodiment, the touchscreen display 704 may reside on the side or the top of the enclosure 100. The display 704 allows the user to control and monitor the unit 10 generally. In an aspect, the user may check the state of charge of an energy storage element 610, 612 powering the motor 402.

Figures 2A, 2B:
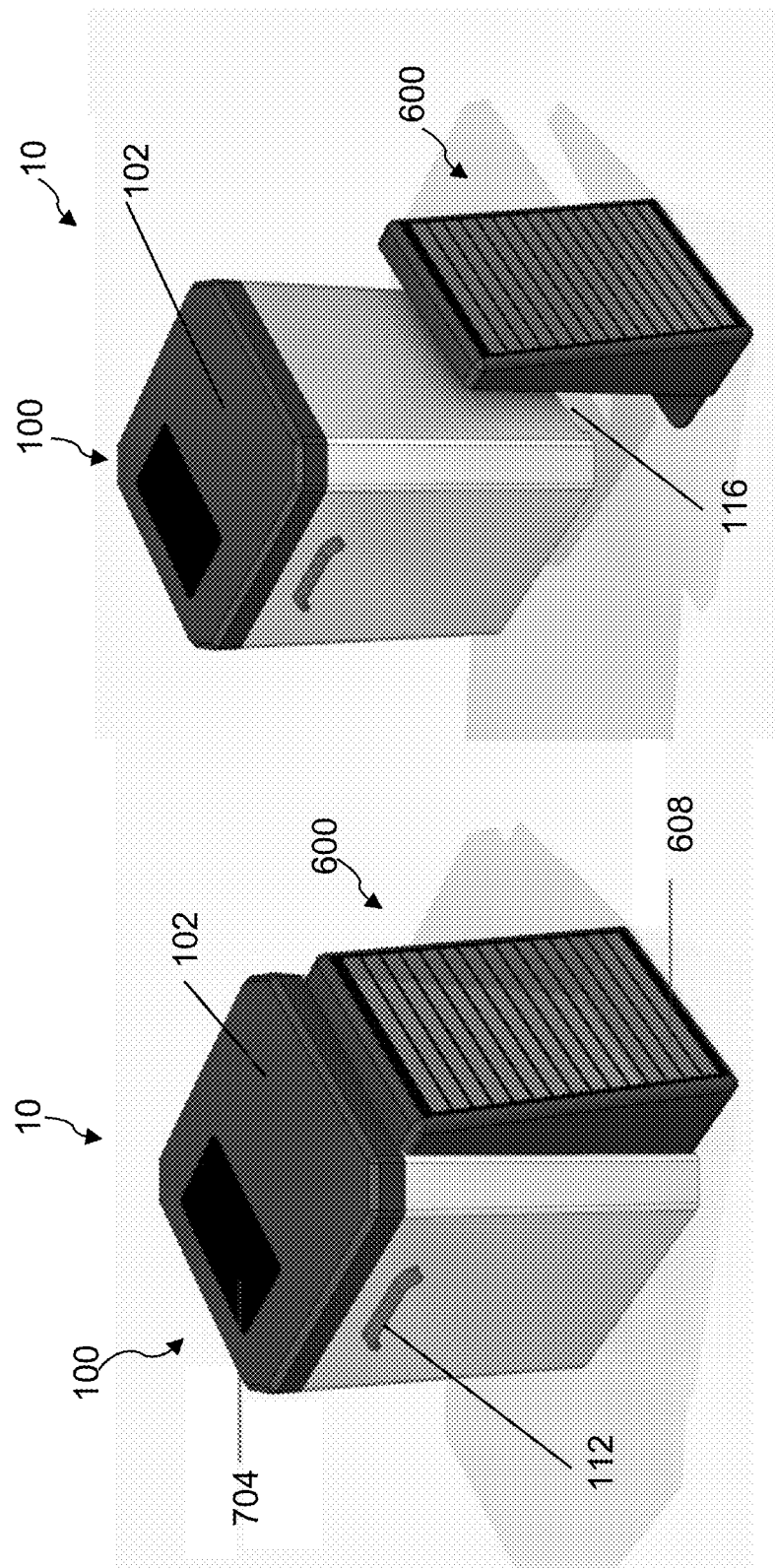
FIG. 2a-b shows top perspective views of the portable solar-powered washer/dryer of FIG. 1 from another angle with the detachable power unit.

The detachable power unit or supply 600 comprises a first energy storage element 610, a first communications port or connector 604, and a power source 602. In an aspect the power source 602 may comprise a solar panel 608, as shown in FIG. 2a. The first connector 604 may mate to the second connector 606 on the enclosure 100 to transfer power to a second energy storage element 612 on or in the enclosure 100. The detachable power unit 600 may be attached to the enclosure 100 (e.g. FIG. 2a) or it may be detached (e.g. FIG. 2b, FIG. 3) and placed elsewhere. The detachable power unit 600 may be placed in direct sunlight to accumulate energy while the remainder of the unit (the enclosure 100) may be stored in another location. At a later time, the detachable power unit 600 may be re-attached to the enclosure 100 to transfer the stored energy or to operate the unit 10.

The electrical connectors 604, 606 facilitate communications between the main enclosure 100 and the detachable power unit 600 as well as permit the transfer of energy from the detachable power unit 600 to the main enclosure 100. The detachable unit's energy storage element 610 and the enclosure's energy storage element 612 may comprise rechargeable electrochemical batteries. Other energy storage elements such as capacitors may also be used.

Figure 3:
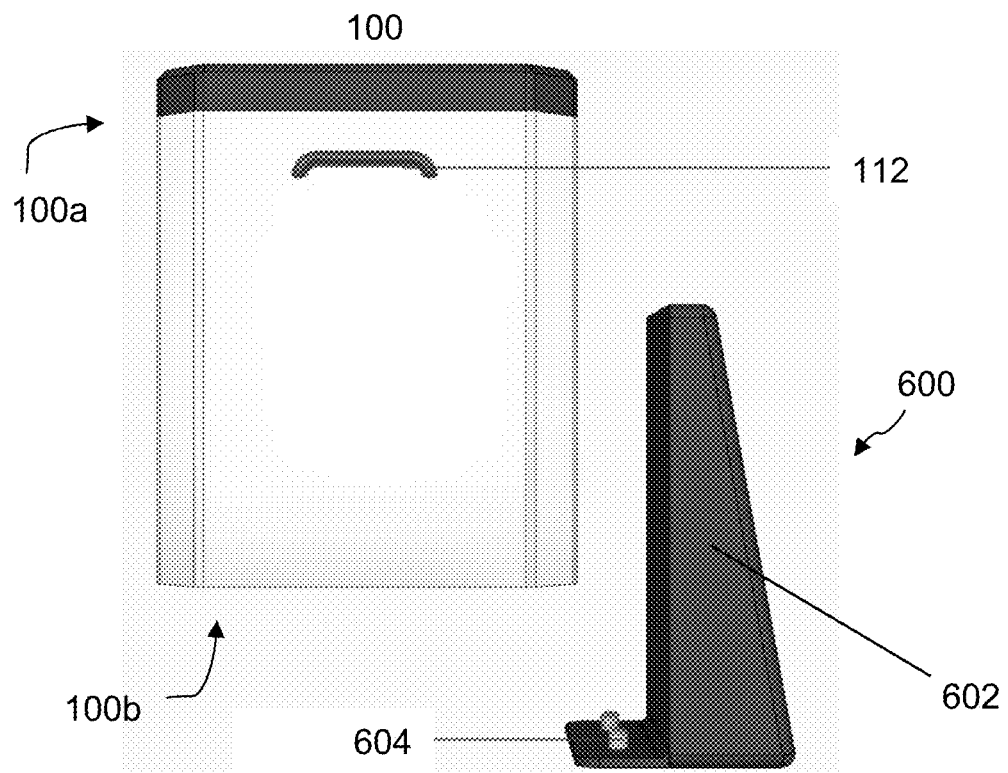
FIG. 3 depicts a side plan view of the main enclosure with the solar power unit of the portable solar-powered washer/dryer of FIG. 1 detached.
Figure 4:
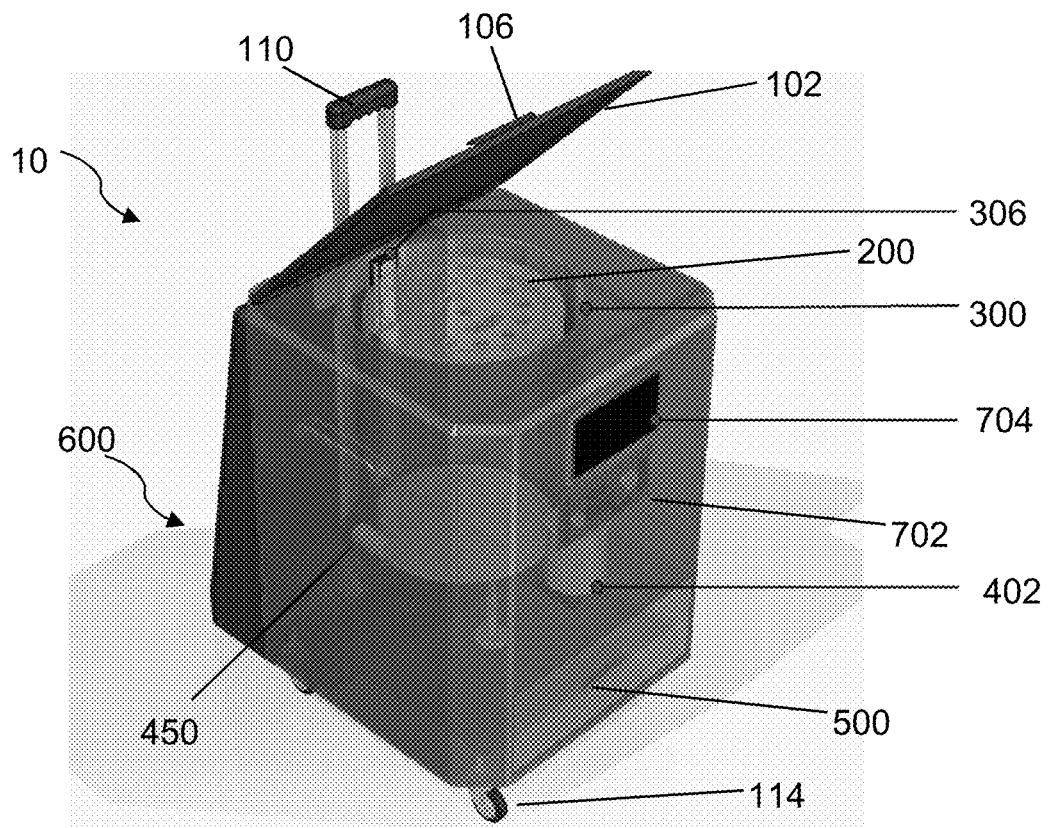
FIG. 4 is a top perspective see-through view of the main enclosure and its internal components of the portable solar-powered washer/dryer of FIG. 1.
Figure 11:
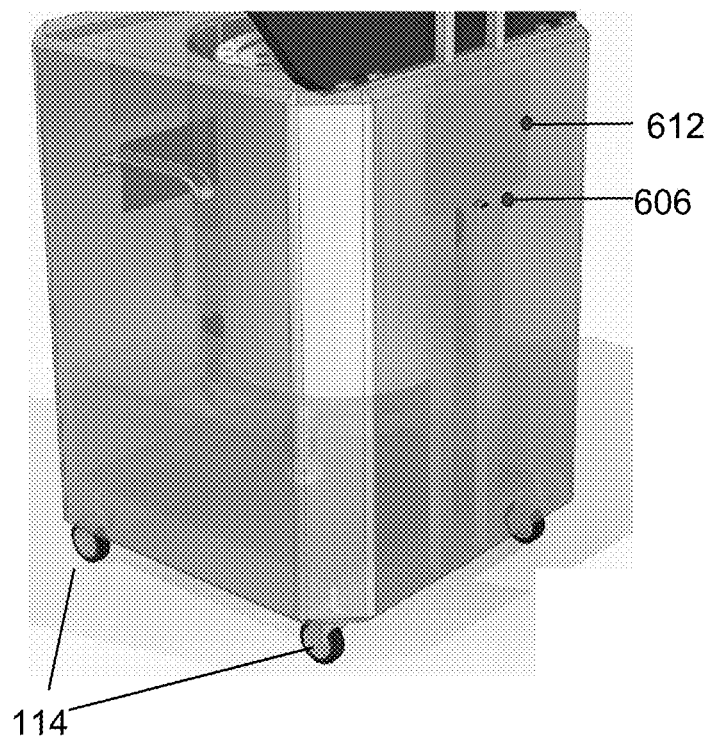
FIG. 11 shows further details of the main enclosure.

In an aspect, FIG. 3 shows the main enclosure 100 with the detachable power unit 600 detached and a side handle 112. In such aspects, the detachable power unit 600 can feature charging pins 604 or connectors. FIG. 11 illustrates another aspect of the connectors 604 to the detachable power unit 600. In this embodiment, the main enclosure 100 has a recess 116 on the bottom 100b, where the detachable power unit 600 fits while still providing room for casters or wheels 114. The detachable power unit 600 may detach to be placed in an advantageous position to collect sunlight without having to move the entire main enclosure 100. The detachable power unit 600 may be lighter and more maneuverable than the system 10 as a whole providing better functionality.

Figure 5B:
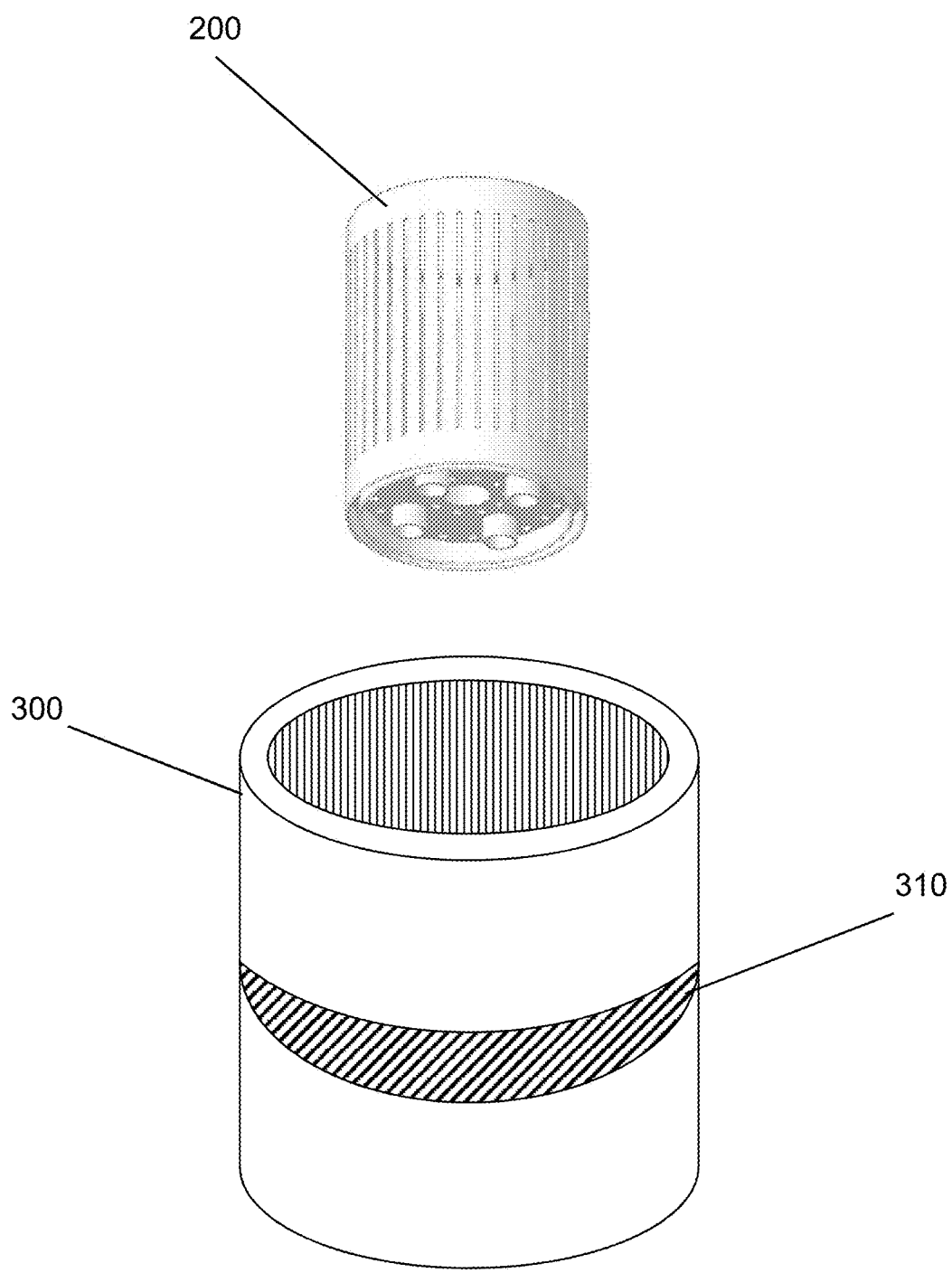
FIG. 5b shows the receptacle with a heating element.

A heating element 310 may be incorporated within the main enclosure 100. In an aspect, as shown in FIG. 5b, the heating element may comprise a drum type heater and may encompass at least a portion of the outside of the receptacle 300. The heating element 310 may be connected to a first energy storage element 610 or to a second energy storage element 612 or to a control electronics subsystem 700.

Figure 6:
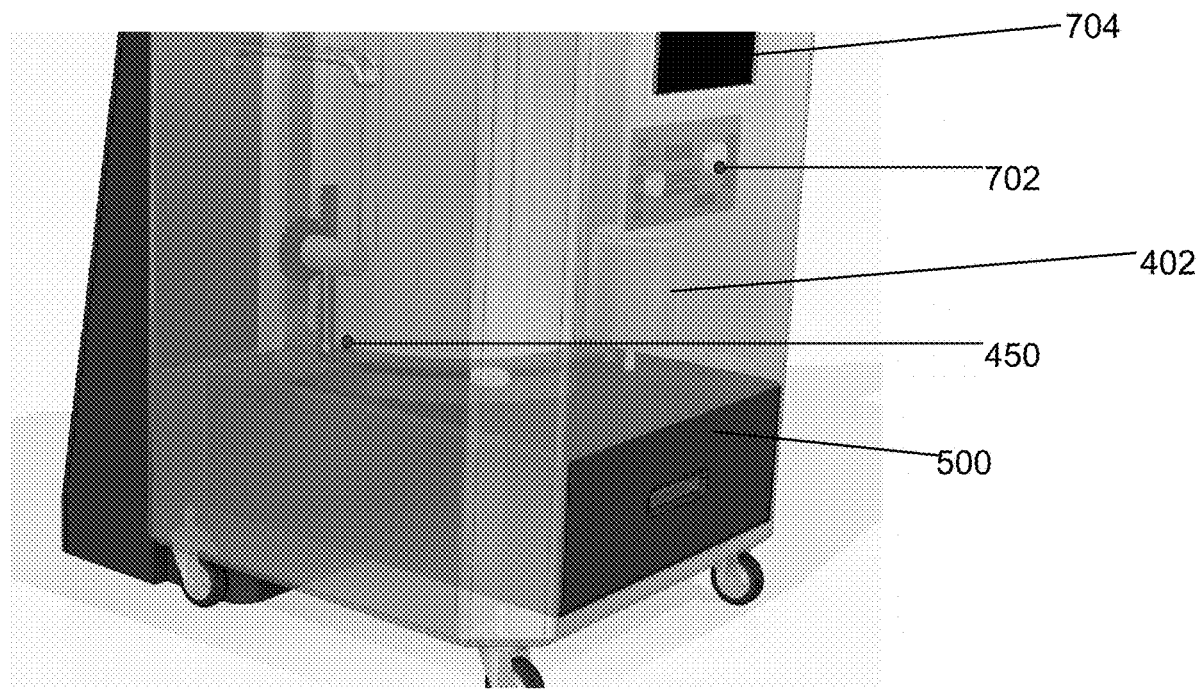
FIG. 6 shows a perspective see-through view of the rack and pinion liquid release mechanism of portable solar-powered washer/dryer of FIG. 1.
Figure 7:
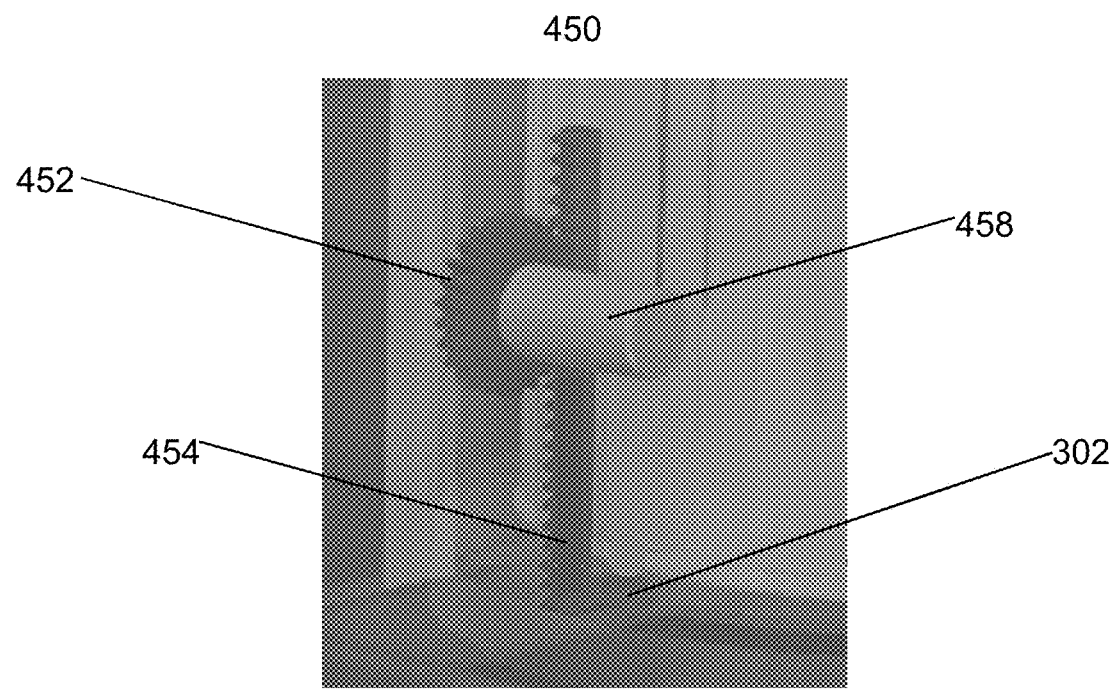
FIG. 7 shows a close up view of the rack and pinion gears of the portable solar-powered washer/dryer of FIG. 1.

FIGS. 6-7 shows some details of the rack and pinion mechanism 450 to open or close the receptacle exit hole 301 using a drain plug or drain cap 302. The drain plug 302 is affixed to the end of the rack gear 454. In normal operation, this drain cap 302 closes off the receptacle 300 to make it liquid tight. When the washing is finished the motor 402 will turn the pinion 452 which will lower the rack 454 and the drain plug 302. The motor 402 may rotate the pinion 452 through a pinion axle 458 directly. The motor 402 may rotate the pinion 452 through a belt drive or some other means. With the drain plug 302 no longer blocking the receptacle exit hole 301, the liquid or other liquid (including particles suspended in the liquid) will drain out of the receptacle exit hole 301 through the drainage tank entry hole 508 and into the liquid drainage tank 502 itself.

Figure 8:
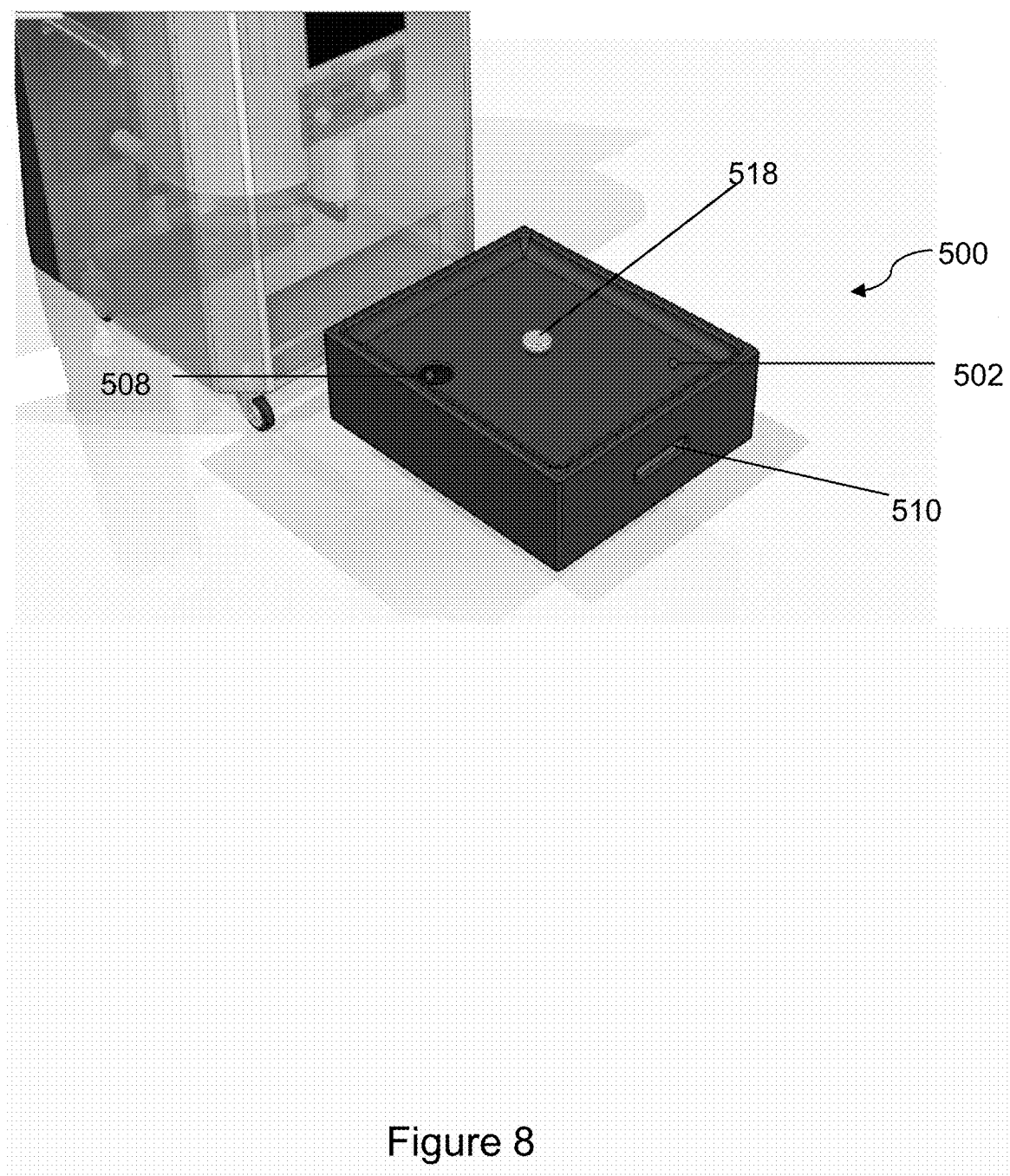
FIG. 8 shows a top perspective view of a liquid drainage tank of the portable solar-powered washer/dryer of FIG. 1 according to an aspect.
Figure 9:
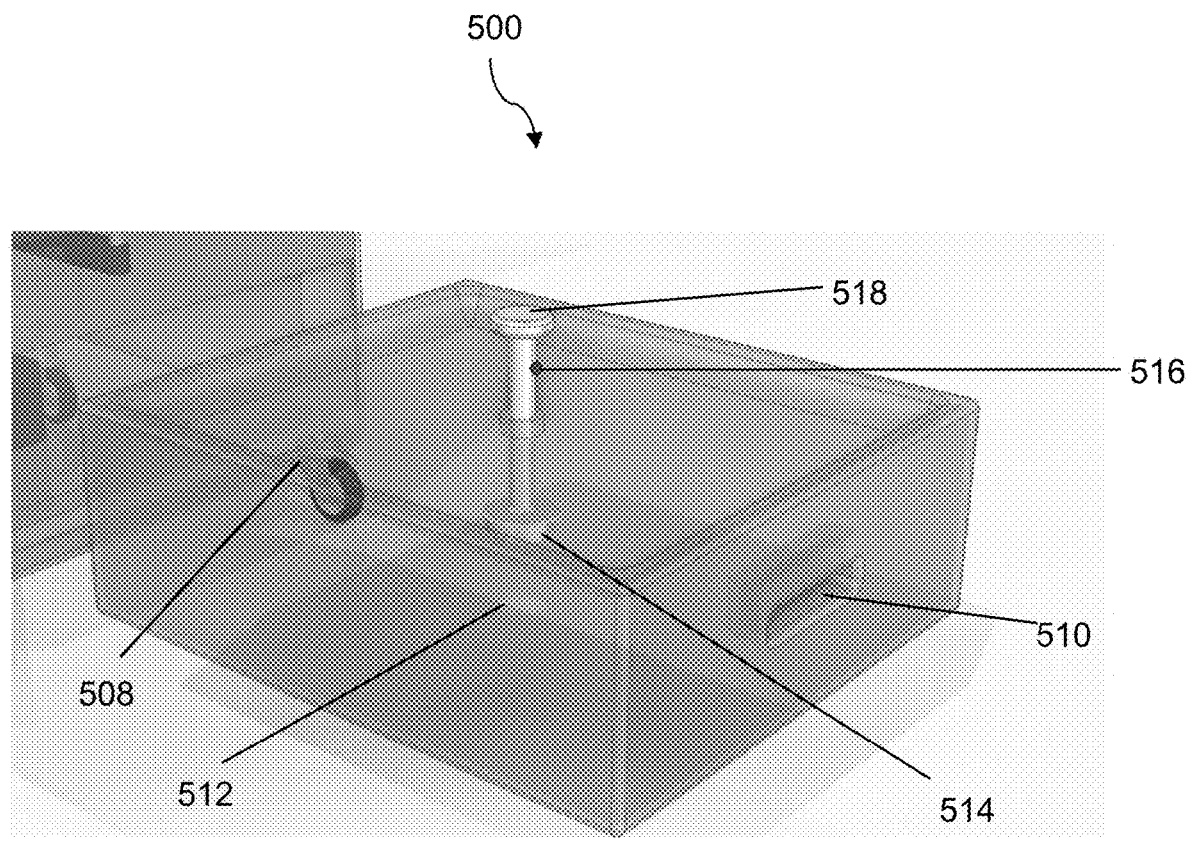
FIG. 9 shows a perspective see-through view of a drain shaft of the liquid drainage tank of FIG. 8.

FIGS. 8 and 9 show details of the liquid disposal system 500 according to an aspect. The liquid disposal system 500 includes a liquid drainage tank 502 with an entry hole 508, which is aligned with the exit hole 301 of the receptacle 300 when mounted inside the main enclosure 100. The drainage tank cover 504 may have a passage for the drain plug shaft 516. Atop the drain plug shaft 516 is a knob 518. The drain plug shaft 516 connects with the drain plug 514. When engaged, the liquid drainage tank's exit hole 512 is plugged by the drain plug 514. To dispose of the liquid, a user may pull the drainage tank 502 out of the main enclosure 100, for example, by using a hand grip 510. The user may then place the tank 502 over a sink or washbasin or out of doors, and pull the knob 518 upwards. This action disengages the drain plug 514 from the exit hole 512 in the bottom of the liquid drainage tank 502 allowing liquid to drain out. Once drained, the user may allow the plug 514 to re-seal the exit hole 512 and then replace the liquid drainage tank 502 into the main enclosure 100, as before.

Figure 10:
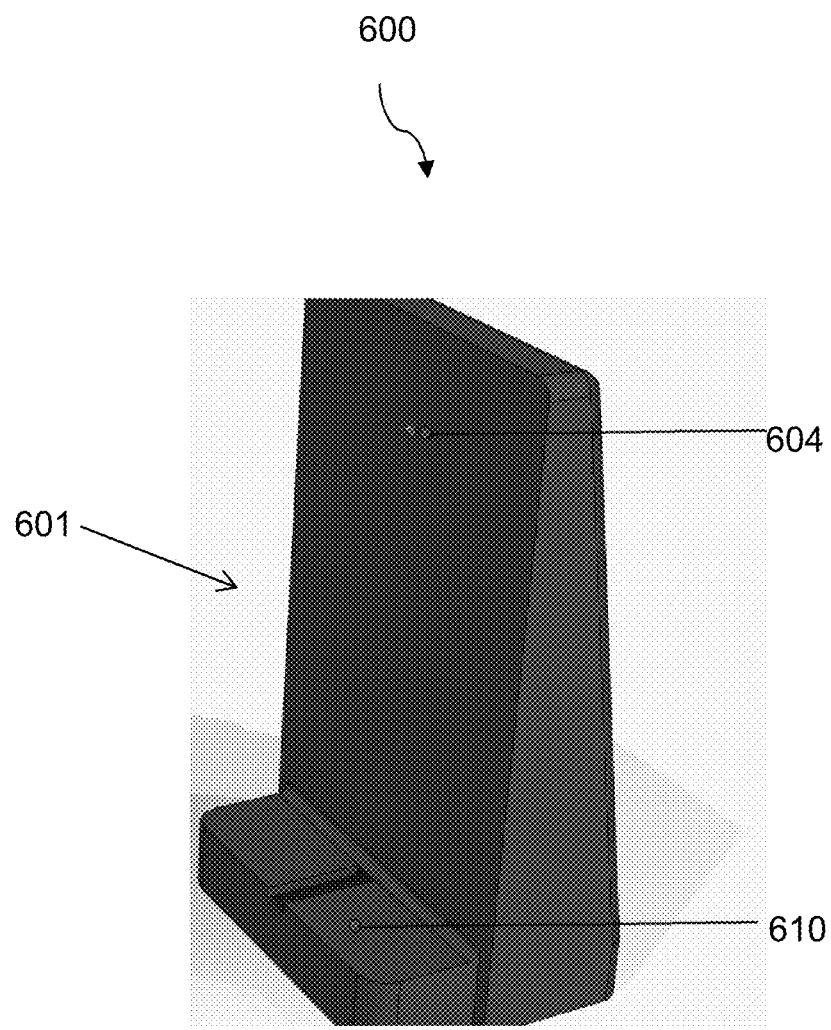
FIG. 10 shows a perspective side view of a solar power unit of a portable solar-powered washer/dryer according to an aspect of the present invention.

FIG. 10 shows an embodiment of the rear 601 of the detachable power unit 600. On the rear 601 of the detachable power unit 600 may be located a first connecting port 604, such as the USB PD port (universal serial bus power delivery) as shown in this embodiment. Other embodiments (see FIG. 3) may have separate charging pins 604 or a communication port in another location or using another style. Examples of other possible connectors include optical connectors or wireless communication devices. The connectors enable transfer of energy from the detachable power unit 600 to the main enclosure 100. The connectors 604, 606 also enable communication between the detachable power unit 600 and the main enclosure 100. The connector 604 may facilitate communication between the control circuit 700 in the main enclosure 100 and the detachable power unit 600. In an aspect there may be a single communication and energy transfer connector 604. In another aspect there may be a communication connector and a separate energy transfer connector.

FIG. 11 shows an embodiment of a side view of the main enclosure 100 with a USB PD port 606 on the side of the main enclosure 100. This second connector 606 is designed to mate with the first connector 604 on the detachable power unit 600. A second energy storage device 612 may be located inside the main enclosure 100. In an embodiment, the detachable power unit's energy storage device 610 or the main enclosure's energy storage device 612 may be a 12 V, 10,000 mA·hr lithium polymer battery.

This unit 10 thereby may replace both a washing machine and a dryer as the unit 10 may wash and dry clothes without extra intervention by the user.

In terms of the energy usage, the washer/dryer combination 10 may require less energy than for a standard washer or a dryer. A standard dryer consumes approximately 2-6 kW (or more) of power and operates for approximately 30-45 minutes to dry a single load of laundry, although it depends on the actual unit and the total amount of laundry in the load. This operation thus consumes in the range of 3-6 Megajoules (MJ) (or more) of energy. The two batteries 610, 612 in the embodiment depicted in FIGS. 10 and 11 may each have a storage capacity of 10,000 mA·hr at 12 V for a total energy storage capacity of 0.8 to 1.0 MJ. This amount of energy is 3× to 6× less than used in a standard conventional dryer so the size of the load of laundry must be smaller than a standard, stationary dryer.

Under normal operation on a sunny day a solar panel 602 will receive the standard insolation of approximately 1000 W/m². The embodiment shown in FIG. 1 shows a solar panel which may have an area of 300 mm by 500 mm or approximately 0.15 m². Thus the maximum solar power anticipated at the earth's surface for such a device is approximately 1000*0.15=150 W. Since only a portion of this energy is converted into electricity this value must be de-rated by the conversion efficiency of the solar panel 602. Assuming a solar panel 602 efficiency of 20% means that this panel will produce approximately 150*0.2=30 W of power, at noon on a sunny day with the solar panel 602 directly in the sunlight at the optimal angle. Power optimizers are known to improve overall energy output and instantaneous power output of solar panels. Incorporating such an electronic element to improve power and energy output may provide an additional benefit for the user.

Operation of the combination washer/dryer may employ one of three sources of energy: either of the two energy storage elements 610, 612 or the detachable power source 602 (e.g. solar panel) or any combination of these three. In one embodiment with electrochemical batteries, either battery 610, 612 may charge the other battery 612, 610 and the touchscreen controller 704 may display the state of charge of each battery plus information about the solar panel 602—historical energy production, whether one battery should charge the other, etc. In one embodiment, the electronic connector(s) 604, 606 between the detachable power unit 600 and the main enclosure 100 may be a USB PD connector with one connector on either side, designed to mate with each other. These connectors 604, 606 may include magnetic elements to help hold them together. In some embodiments there may be separate connectors among the solar panel's energy storage element 610, the electronic control board 700, and the main enclosure's energy storage element 612. The controller 700 may instead allow the solar panel 602 to charge the main enclosure's energy storage element 612 directly. For such embodiments, no USB PD connector need be used or an alternative connector may be chosen instead. In some embodiments other forms of communication between the detachable power unit 600 and the main enclosure 100 may be employed. For instance, in some embodiments, the main enclosure 100 could use, for instance, Wi-fi or Bluetooth to connect with the detachable power unit 600 to know the state of charge of the battery 610 located there, or the detachable power unit 600 could communicate with the main enclosure 100 to display the status of the solar panel 602, whether producing a certain level of power or not producing any energy. Likewise, another embodiment may use optical communication between the main enclosure 100 and the detachable power unit 600.

For those embodiments with a USB PD connector, the connector 604, 606 is rated for up to 100 W at 10 V for 5 A of current. With the 12 V lithium batteries 610, 612 of one embodiment, this would mean a maximum power of 60 W (12 V*5 A) being transferred at any one time. Given that the maximum solar panel 602 output is approximately 30 W, the charging time would be limited by the 2.5 A it would produce at 12 V. There may also be electronics within the solar panel 602 portion to help optimize solar cell output and also to condition the power provided to the energy storage devices 610, 612 or to the main enclosure 100 for operating the motor 402, the touchscreen controller 704, or other electronic elements or devices 700. At this level of solar-produced current, it will take approximately 4 hours to fully charge one of the batteries 610, 612 to 10,000 mA·hr. This level of current is satisfactory as these types of batteries work well with this slow rate of charging rather than using much higher currents, which might damage the batteries due to overheating.

In order to facilitate normal operation, sensors may be placed in various locations around the main enclosure 100 or the solar panel 600. For instance, in some embodiments, a sensor could detect whether the drain cap 302 of the receptacle 300 in the main enclosure 100 was correctly closing off the receptacle 100 so it would be safe to add liquid and detergent 804. In another example, if the liquid drainage tank 502 were not properly in place and its entry hole 508 thus not properly aligned with the receptacle's drain 301, then the user could be alerted through an audio alarm or a display alert message on the touchscreen display 704 that the user was in danger of allowing the liquid to drain without proper positioning of the drainage tank 502. Similarly, a sensor or sensors may detect whether the mating portion 206 of clothes bin 200 is correctly attached to the axle 304. If the bin 200 were not correctly attached or incorrectly seated, the touchscreen 704 could display a message or otherwise caution the user of the misalignment. Likewise, if the energy storage devices 610, 612 did not contain enough energy for a full load, or a sensor detected a larger than normal weight of clothes in the bin 200, then the user could be notified to re-assess whether such a large load of laundry required processing immediately or whether a smaller load could be fully processed instead or whether the load only required washing 806 but not drying 808.

The touchscreen 704 allows the user to interact with and control the unit 10. Certain embodiments may include pre-selected cycles such as longer washing times or incorporating a spin-dry cycle after draining the liquid from the receptacle 300 before moving on to a heated dry cycle 808. Many other different cycles may be selected or new ones programmed. The touchscreen controller 700 may incorporate both a touchscreen display 704 for viewing information and selecting options and also an electronic controller 702 for controlling the various elements. These may be separated or may form a single unified element of the combination washer/dryer. For instance, the controller 700 may enable the selection of whether the motor 402 drives the pinion 452 to move the rack 454 to open or close the drain plug 302 which allows liquid to drain from the receptacle 300 or whether the rack 454 and attached drain plug 302 remain in the up position allowing the liquid to remain in the receptacle 300. Furthermore, the controller 700 may enable the pinion 452 as well as the motor 302 to rotate in either direction for any number of steps. For instance, the motor 302 may be controlled to rotate the clothes bin axle 304 clockwise for a certain time or a certain number of rotations followed by a rotation in the counter-clockwise direction. The motor 302 may be controlled to rotate less than a full rotation in one direction before being instructed to rotate in the opposite direction for less than or more than a full rotation. Such a mode may be achieved in conventional washing machines by having vanes jostle or agitate the clothing. This agitation may be achieved here by jostling the bin 200 containing the clothes. In addition, the motor 302 may operate at many speeds allowing for slower or faster rotational velocities to be achieved.

The touchscreen controller 704 may also contain instructions allowing interactions with the user, such as displaying warnings if the user wishes to operate the unit 10 but the state of charge of the batteries 610, 612 is too low to operate the selected cycle. The touchscreen 704 may inform the user to charge the batteries 610, 612 longer in full sun with an estimate of the time required or it may inform the user that only a partial cycle may be completed or an unheated drying cycle 808 carried out as an alternative. Also the touchscreen controller 704 may interact with a personal user electronic device, such as a smart phone, personal computer, tablet, laptop computer, notebook computer through some means of communication such as the aforementioned Bluetooth, Wifi, or similar radiofrequency schemes to convey alerts or warnings or notices to the user.

As is often the case with conventional dryers, lint may clog the outlet of the receptacle 300 so a mesh casing 306 with a removable lint trap 308 is integrated into the upper side of the receptacle 300. Prior to the execution of a drying cycle, the liquid would be allowed to drain out of the receptacle 300 into the liquid drainage tank 502. While the drain plug 302 is in the open position, the controller 700 will instruct the motor 302 to rapidly spin the bin. The liquid in the soaked clothing may, by centrifugal force, be forced out of the clothing, through the openings in the side of the bin 200, and then drain through the receptacle drain 301 into the drainage tank 502. After this spin cycle, a drying cycle 808 could commence, and may include heating air entering the receptacle 300 or heating the receptacle 300 itself.

In another embodiment, the portable washer-dryer may connect to another power source through the electrical connector, for instance, to a home energy storage unit or to a solar panel fixed to an outside structure.

In normal use, this device 10 will wash one set of clothes (e.g. pair of pants+shirt+underclothes). The clothes bin 200 may be shaped to help move the liquid or the air around the receptacle 300. For instance, in an embodiment, the clothes bin 200 may comprise an impeller to create a flow of air into and around the wet clothes.

Figure 12:
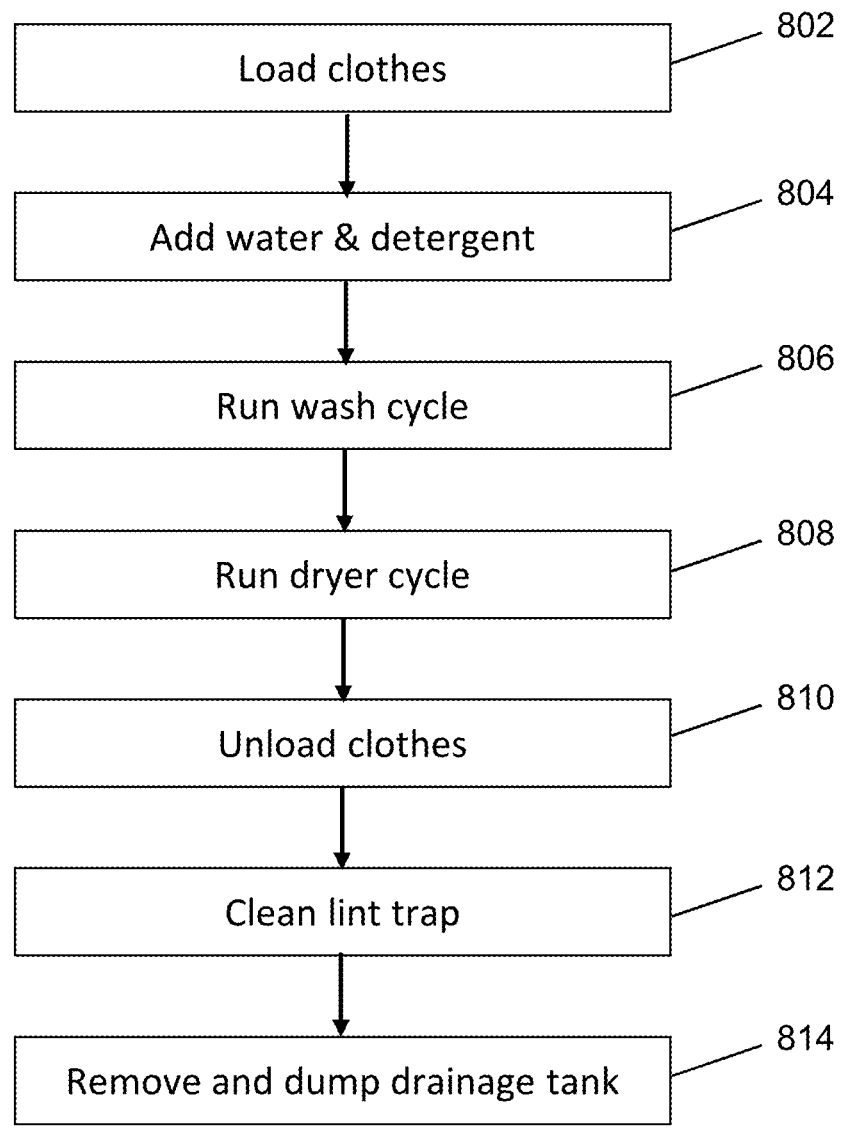
FIG. 12 shows a process flow for using the present invention.

In one embodiment, a method of operation 800 of the unit 10 may involve the following steps shown in FIG. 12. The user may load clothes (step 802). The loading may include putting the clothes into clothing bin while the bin 200 is in the receptacle 300 or when the bin 200 is removed. In the latter case, the bin 200 must then be inserted back into the receptacle 300. The user may add water and detergent or other chemicals (e.g. fabric softener or bleach) into the receptacle 300 (step 804). The user may then instruct the controller 700 to run a wash cycle (step 806). An example wash cycle may comprise having the electronic control circuit 700 initiate the motor 402 to rotate or agitate the clothes bin 200. When the wash cycle is completed (step 806), the user may then instruct the controller 700 to run a dryer cycle (step 808). A dryer cycle may include first draining the liquid from the receptacle 300 into the liquid drainage tank 502 by instructing the motor 402 to detach the receptacle drain plug 302 from the receptacle 300 to open the receptacle drain 301 and allow the liquid to enter the liquid drainage tank 502. A second step in a dryer cycle 808 may be to have the motor 402 spin the clothes bin 200 at a high rotational velocity to force liquid out of the clothes. Once the dryer cycle is completed, the user may unload the clothes (step 810). Next, the lint trap may be emptied (step 812). After unloading the clothes, the user may remove the liquid drainage tank 502 and appropriately dispose of the contents (step 814).

Having thus described exemplary embodiments of the present invention, it should be noted by those skilled in the art that the disclosures are exemplary only and that various other alternatives, adaptations, and modifications may be made within the scope of the present invention. Accordingly, the present invention is not limited to the specific embodiments as illustrated herein, but is only limited by the following claims.

I claim:

1. A solar-powered combined washer-dryer apparatus comprising:
   a rigid enclosure;
   a cylindrical liquid-tight receptacle within the enclosure;
   a rotatable clothes bin configured to sit within the cylindrical liquid-tight receptacle;
   a motor to rotate the clothes bin;
   an electronic control circuit to control the motor;
   a detachable power unit comprising:
      a power source;
      a first energy storage element; and
      a connector to the electronic control circuit, wherein the detachable power unit powers the electronic control circuit and the motor; and
   a second energy storage element in the enclosure, wherein the second energy storage element powers the electronic control circuit and the motor.

2. The apparatus of claim 1, wherein the power source comprises a solar panel.

3. The apparatus of claim 1, wherein the energy storage elements comprise electrochemical batteries.

4. The apparatus of claim 3, wherein the electrochemical batteries comprise lithium ion polymer batteries.

5. The apparatus of claim 1, further comprising a retractable/extendable handle bar in the enclosure.

6. The apparatus of claim 1, further comprising a drainage tank below the receptacle and connected via a re-sealable cap.

7. The apparatus of claim 1, wherein the solar panel further comprises a power optimizer.

8. The apparatus of claim 1, wherein the electrical connector comprises a universal serial bus connector.

* * * * *